(12) United States Patent
Farnia

(10) Patent No.: US 7,847,443 B2
(45) Date of Patent: Dec. 7, 2010

(54) MANUFACTURE OF ELECTRIC MOTOR COMPONENT

(75) Inventor: David Farnia, Kane, IL (US)

(73) Assignee: Burgess-Norton Mfg. Co., Inc., Geneva, IL (US)

( * ) Notice: Subject to any disclaimer, the term of this patent is extended or adjusted under 35 U.S.C. 154(b) by 225 days.

(21) Appl. No.: 12/082,198

(22) Filed: Apr. 10, 2008

(65) Prior Publication Data

US 2009/0256430 A1 Oct. 15, 2009

(51) Int. Cl.
H02K 15/12 (2006.01)
H02K 1/18 (2006.01)
H02K 1/28 (2006.01)

(52) U.S. Cl. .................. 310/44; 310/209; 310/216.001; 310/216.007; 310/216.074; 310/216.079; 310/216.088; 310/255

(58) Field of Classification Search .................... 310/44, 310/209, 216.007, 216.079, 216.074, 216.088, 310/255; H02K 15/12, 1/18, 1/28
See application file for complete search history.

(56) References Cited

U.S. PATENT DOCUMENTS

| | | | | |
|---|---|---|---|---|
| 2,655,613 A | * | 10/1953 | Wieseman | 310/194 |
| 2,677,256 A | * | 5/1954 | Donandt | 464/167 |
| 4,045,696 A | * | 8/1977 | Lutz et al. | 310/49.43 |
| 4,152,570 A | * | 5/1979 | Inoue et al. | 219/69.2 |
| 4,879,486 A | * | 11/1989 | Yumiyama | 310/216.076 |
| 4,920,295 A | * | 4/1990 | Holden et al. | 310/209 |
| 5,057,733 A | * | 10/1991 | Sonoda et al. | 310/269 |
| 5,130,592 A | * | 7/1992 | Bitsch et al. | 310/209 |
| 5,627,419 A | * | 5/1997 | Miller | 310/74 |
| 6,407,472 B1 | * | 6/2002 | Takayanagi | 310/45 |
| 6,756,709 B2 | * | 6/2004 | Kobayashi et al. | 310/43 |
| 2004/0189138 A1 | * | 9/2004 | Jack | 310/254 |
| 2007/0200450 A1 | * | 8/2007 | Yukitake | 310/216 |
| 2007/0241628 A1 | * | 10/2007 | Himmelmann et al. | 310/190 |
| 2009/0230811 A1 | * | 9/2009 | Asano | 310/216.001 |
| 2009/0256430 A1 | * | 10/2009 | Farnia | 310/44 |

* cited by examiner

Primary Examiner—Quyen Leung
Assistant Examiner—John K Kim
(74) Attorney, Agent, or Firm—Edward J. Brosius

(57) ABSTRACT

The modular conical stator pole provides an improved conical stator assembly on electrical machines. The improved conical stator pole assembly comprises a plurality of stator poles, each pole comprising an assembly having a coil secured on a soft magnetic composites (SMC) stator pole tooth by inserting a winding support through the open core of the coil and attaching a back iron and a stator face to either end of the winding support. Each stator pole having a parallelogram shaped cross section for forming a conical shaped rotor space when the stator poles are assembled having the back irons bearing against each other to space the coils apart and form a conical shaped outside profile of the stator pole assembly. The conical stator having a small end and a big end. The tooth comprising a winding support integrally molded with either the back iron or the face.

6 Claims, 3 Drawing Sheets

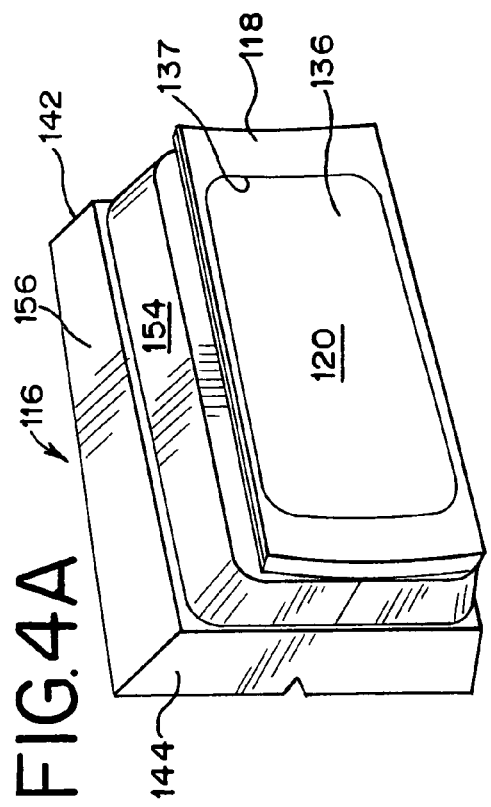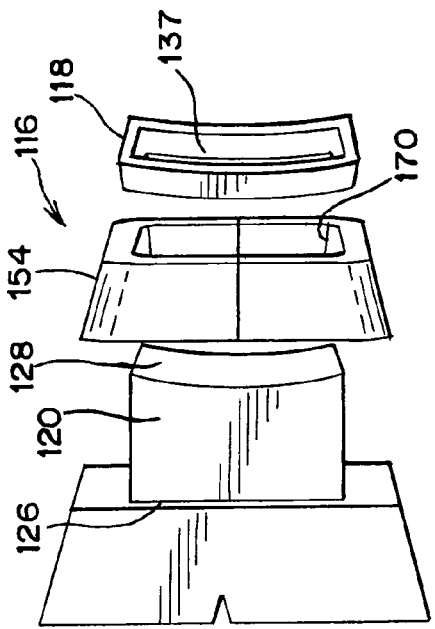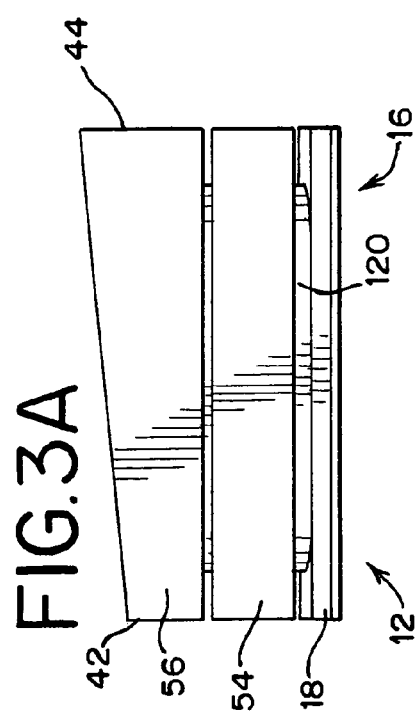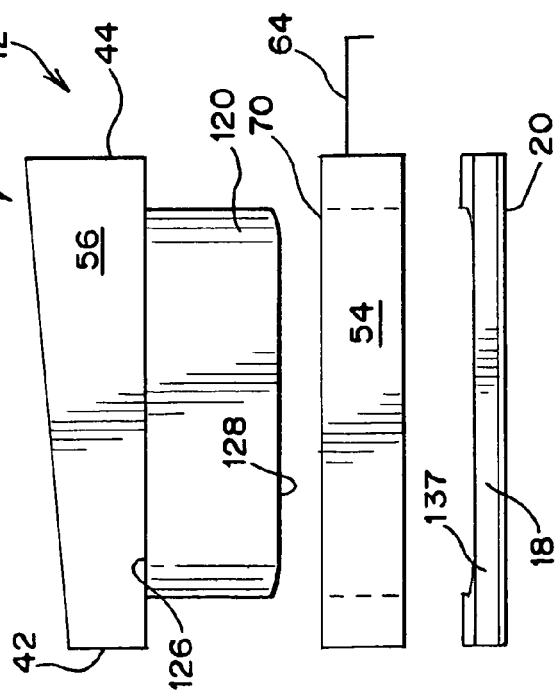

MANUFACTURE OF ELECTRIC MOTOR COMPONENT

BACKGROUND OF THE INVENTION

The present invention relates to electrical machines and more particularly a design and method of manufacture for a conical stator assembly.

Electric motors and generators have a stationary element, termed a stator and movable or rotating elements termed the rotor. The interaction between the stator and the rotor is caused by the interaction on a magnetic field generated by either the stator or the rotor. Such magnetic field is usually generated or induced by electric currents in a winding placed on either the stator or the rotor or both. The forces imparted on the rotor are a function of the interaction of the stator and the rotor magnetic fields and the moment arm of the rotor calculated by the radial displacement of the magnetic field of the rotor with respect to the axis of the rotor. Such stator winding usually comprises a plurality of coils wound around a winding support. The winding support is usually comprised of a soft magnetic material which traditionally is made of laminations of selected steel materials. The laminations are insulated from each other in order to reduce eddy currents.

It's become known to replace laminated steel materials of the stator or rotor cores with ferro magnetic powder particles. These ferro magnetic particles are compacted in a powder metallurgy operation to form the winding support. The ferro magnetic power particles themselves are electrically insulated from each other so the resulting compacted product exhibits a low eddy current loss in a manner similar to the use of stacks of laminated steel materials. Such use of compacted metal particles comprised of ferro magnetic powder particles for cores electrical machines is disclosed in U.S. Pat. Nos. 6,956,307 B2, 6,300,702 B1 and 6,441,240 B1.

Prior art motor designs use a significant amount of air space and can be large and heavy when assembled making shipping the assembled electric motor costly. When installing or maintaining, prior art motors require special handling due to the size and weight. Furthermore, prior art motors are not designed to be modular and capable of being broken down to separately shipped components. Design changes often require motor manufacturers to retool a facility to manufacture a different design. Retooling is generally very expensive and requires down time from production while the tooling is modified or replaced.

Conventional prior art motors use large amounts of copper in the windings to form each pole of the stator. The magnetic field generated is related to the amount and placement of the copper as well as the current in the windings. Power density may be increased by increasing the effective use of the copper and maximizing the inner surface area of the stator. Increasing the power density of the motor may also be accomplished by forming a modular shaped segment from the ferro magnetic particles to conform the electric motor to the space available.

Prior art symmetrically shaped cylindrical motors do not maximize the available mounting space available in installation locations. It is desirable that the stator fill as much of the open space as is practical to improve performance by optimizing the interaction between the electromagnetic field of the stator and the rotor. This produces a more efficient motor generator. It is further desirable to maximize the radial space available in order to advantageously use the increased radial dimension of a conical design to increase the moment arm to increase available torque at the drive shaft of the motor. Such terminology is deemed as the power density of the motor.

SUMMARY OF THE INVENTION

The modular conical stator pole provides an improved conical stator assembly on electrical machines and, more specifically an improved conical stator assembly for use in electrical motors and generators. The improved conical stator pole assembly comprises a plurality of stator poles. The conical stator having a small end and a big end. Each stator component dimensioned to a tapered assembly of predetermined length. Adjacent stator components are assembled to form a tapered stator pole, a plurality of tapered stator poles are assembled circumferentially about an axis to form a conical shaped stator assembly.

Each stator pole component comprises a winding and a tooth. The tooth comprises a back iron, body and a face. A winding is created either by winding directly onto the tooth body, or by prewinding on a bobbin having an open core and inserting the tooth into the bobbin, or by winding around a mandrel to form an open core and inserting the wound coil over the tooth in the open core. The conical shape may be formed by molding the face of each stator pole component in a trapezoidal shape having a tapering cross section to form the overall interior and exterior conical shape of the conical stator. Alternatively, the back iron may be molded with a trapezoidal shape thus forming the conical shape. The back iron and face may have a parallelogram shaped cross section to dispose the face at an angle to the axis forming the conical shaped rotor space. In either configuration the rotor space is formed in a conical shape with the face of each pole component having a concave radial cross-sectional shape about the axis of the stator while the axial dimension is disposed in a non-parallel relation to the axis creating the conical shaped rotor space.

The tooth may be formed of ferrous magnetic metal powder particles. These particles are processed to generally be mutually insulated. The ferrous magnetic metal powder particles are pressure formed into the predetermined shape for the tooth tip and the back iron in a powder metal operation by die compacting and heat treating. The tooth body may be formed integral to the back iron for inserting the body into the open core of the coil and securing the coil by attaching the face to the body, or forming the body integral to the face with the back iron attached to the body for securing the coil in place. The tooth body may be disposed perpendicular to the stator axis of perpendicular to the stator face.

The stator face may be formed as a fully formed face of the stator pole having one or more, spaced tooth bodies extending therefrom. For example, a stator face having three tooth bodies attached, extending radially away from the stator face and spaced from each other may be formed. Three coils, each coil having an open core may be assembled onto the stator face having one coil disposed over each tooth body. A back iron and face are secured to each tooth body having the coil intermediate the back iron and the face to hold the coil on the tooth body. The back iron may be a three segment shape or may comprise three discrete back irons as discussed herein for securing the three coils on the spaced tooth bodies extending from the stator face. This integral stator face provides additional support to hold the coils in spaced relation and minimizes magnetic field disruptions caused by discrete edges between separate stator faces in a stacked component design. The back iron and the conical face on the tooth tip may both be formed with a single tooth body holding a single winding on the stator pole.

The conical stator assembly is formed of a plurality of stator pole means each comprising a generating means electrically connected to an electrical power supply, a support means formed of ferrous magnetic metal powder particles, the support means defining a field supporting and directing means holding the generating means in spaced relation to the axis of the rotor. The field pole means assembled with other field pole means to form a multi-pole stator. The trapezoidal shapes and complex angles of the support means disposing the generating means in spaced relation to the axis of the stator forming a conical rotor space and/or a conical outside stator shape.

It's a feature of the present invention that such an improved conical stator assembly comprises a shape for optimizing the power density of the motor and maximizing available torque by increased moment arm at the big end of the conical design and increasing the active length of the stator. The conical design provides a larger moment arm at the big end for transferring the reactionary force of the interaction of the stator magnetic field and the rotor magnets to provide increased torque compared to a cylindrical design.

Torque is increased by the increased moment arm of the larger radial displacement of the rotor coils with respect to the axis of the rotor. This increased displacement takes advantage of the conical shape of the stator. Furthermore, the conical shape provides increased active length on the stator pole for increasing the flux conducted to the rotor. the modular shape allows the motor to securely fit into the space available based on the particular application.

Further, the rotor may be axially moved with respect to the stator. The rotor is moved in a direction of from the small end of the conical shape towards the large end of the conical shape to uniformly change the air gap between the rotor and stator to decrease back emf and weaken the rotor flux allowing an increased speed range for a permanent magnet motor design. This increase in air gap reduces the loses of the motor and the corresponding flux density exponentially.

Each stator component may be shipped as individual components for assembly in the field by a machine assembly team. Most motor failures are in the bearings or windings. The modular design allows the coil to be removed from the stator component, a new coil slipped onto the tooth body and the motor reassembled. Furthermore, in the event of a component failure, a modular stator component part of the electrical machine may be shipped for replacement without replacing the entire motor. In this way each pole of the conical shaped stator is maintainable at the motor site.

BRIEF DESCRIPTION OF THE DRAWINGS

FIG. 3a is a perspective view of an assembled stator pole.

FIG. 3b is an exploded perspective view of the assembled stator pole of FIG. 3a.

FIG. 4a is a perspective view of an assembled stator pole of a second embodiment.

FIG. 4b is an exploded perspective view of the assembled stator pole of FIG. 4a.

DESCRIPTION OF THE PREFERRED EMBODIMENT

Figure 1:
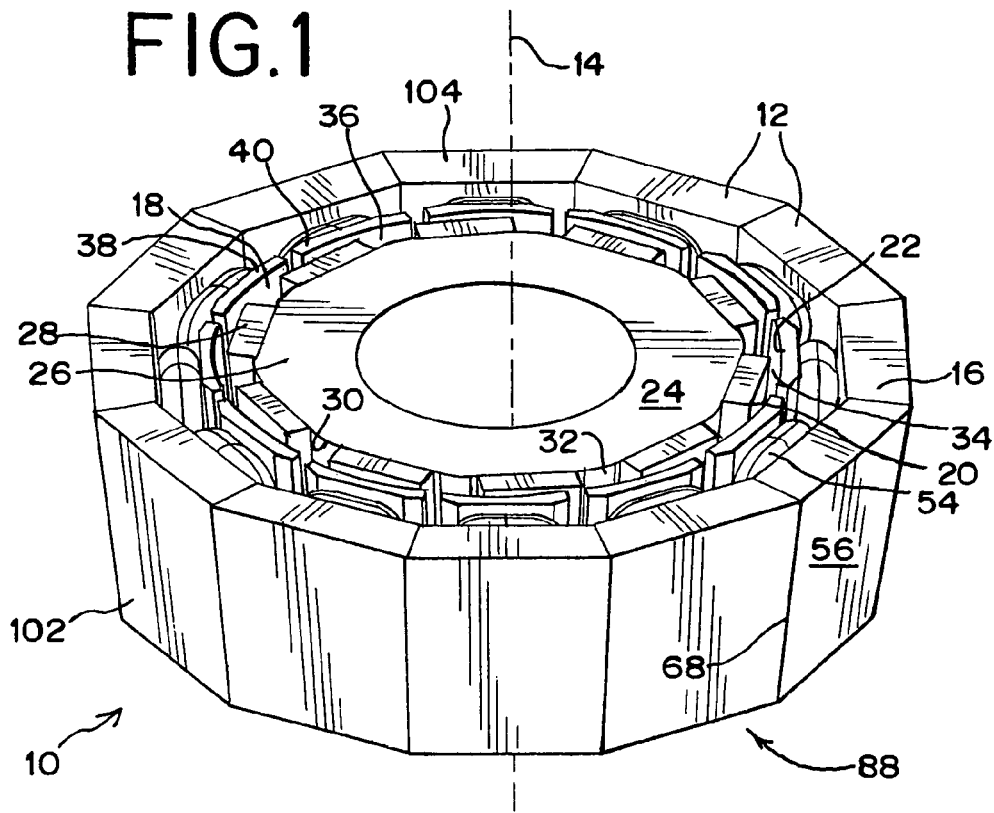
FIG. 1 is a perspective view of the conical shaped stator showing the rotor in place.

Referring to FIG. 1, the conical shaped stator 10 comprises a plurality of stator poles 12 assembled circumferentially about a stator axis 14. Each pole 12 comprises a modular molded tooth 16. The tooth 16 comprises a stator face 18 and a tooth body 120 (FIG. 3b). The stator face 18 has a generally rectangular shape tilted at an axial angle to define the conical shaped interior surface 20 defining a rotor space 22. A rotor 24 is rotatably mounted in the rotor space. The rotor 24 is axially aligned along the axis 14 of the stator and held in place by bearings or the like (not shown) to rotate in the rotor space. The rotor comprises a core 26 having a plurality of magnets 28 disposed along the outer perimeter 30. The magnets 28 are isolated from each other by dividers 32. Each magnet 28 defines a pole on the rotor 24. the outer perimeter 30 is precisely machined to maintain a predetermined air gap 34 between the rotor 24 and the stator 10.

The stator 10 surrounds the rotor space with the plurality of spaced stator face 18 portions of each pole 12. The stator faces 18 are formed having an arcuate inner surface 36, a generally flat outer surface 38 and a pair of substantially similar axial ends 40.

The arcuate inner surface 36 is axially concave forming a circular cross sectioned interior space 20. The tooth 16 may be formed of soft magnetic composites (SMC) comprising ferrous magnetic metal powder particles. These particles are processed to generally be mutually insulated. The ferrous magnetic metal powder particles are pressure formed into the predetermined shape for the tooth 16 in a powder metal operation by die compacting and heat-treating.

Continuing to refer to FIG. 1, the tooth 16 further comprises a back iron 56 on the outside of the tooth 16. The back iron 56 is attached to the tooth 16 to secure a coil 54 disposed on the tooth 16 between the tooth face 18 and the back iron 56. The back iron 56 has edges 68 for bearing against adjacent poles 12 to hold the coil 54 of each pole in spaced relation to each other coil 54 on the adjacent poles 12.

The conical design shown in FIG. 1 applies torque on the rotor 24 as a function of the magnetic force interacting between the stator pole 12 and the magnet 28 on the rotor 24 and the moment arm measured from the air gap 34 to the axis 14. The moment arm is larger adjacent the large end 104 and smaller adjacent the small end 102 of the stator assembly 10. The stator face 18 is disposed at a non-parallel circumferential orientation to the stator axis 14 to form the conical interior surface 20 of the conical stator 10 for rotatably accepting a conical shaped rotor therein.

Figure 2:
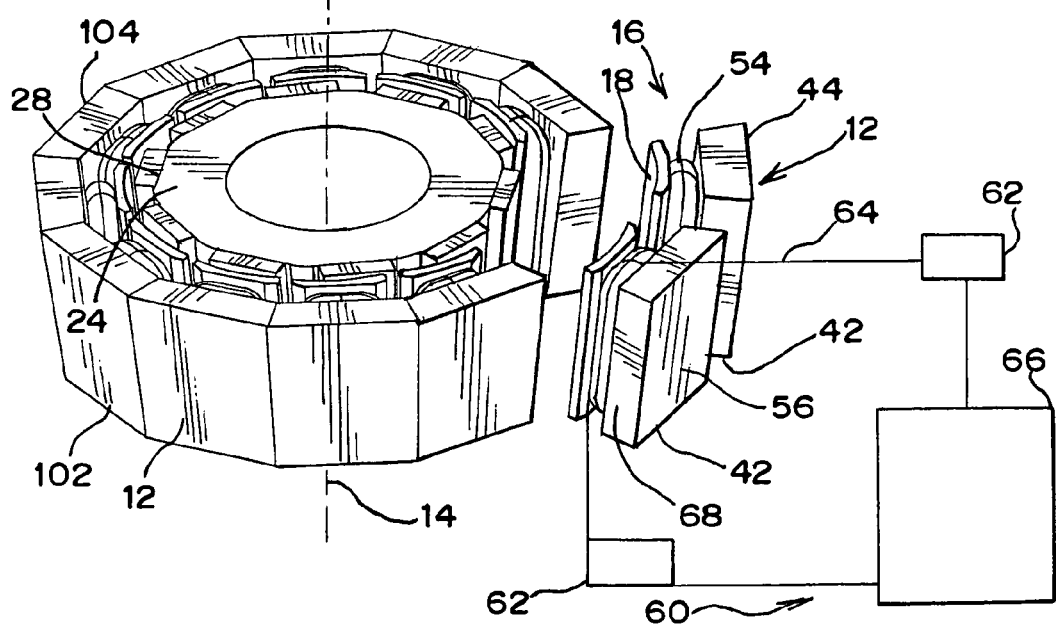
FIG. 2 is an exploded view of FIG. 1 showing two poles separated from the conical shaped stator electrically connected for motor/generator mode.

Referring to FIG. 2, the poles 12 are removably assembled about the axis 14 to form a multi-pole 12 stator 10. Each pole is formed of a ferrous magnetic metal powder particles are pressure formed into the predetermined shape. The poles are individual field generating systems using the coil 54 as a generating means and the tooth tip 14 as a magnetic field carrying means to support and direct the magnetic field generated by the coil to interact with the magnets 28 of the rotor 24. The axial end 42 adjacent the small end 102 has a first circumferential length and the axial end 44 adjacent the large end 104 has a second circumferential length, the first length being smaller than the second length due to the conical arcuate shape of the tooth 16. The angled orientation of the axial dimension of the stator face 18 to the axis of the stator may increase the active length of the entire stator pole 12 by as much as 10%.

It should be understood the rotor magnets 28 may be permanent magnets 28 or electro magnets positioned and oriented to form a magnetic pole on the rotor 24. The coil 54 is connected to an electrical device 60 which may be a power supply 66 to create a current in the coil 54 to generate a magnetic field for interaction with the magnets 28 of the rotor 24. Coil 54 is electrically connected by conductor 64 having connecting means 62 for electrical connection to power supply 66.

The electric motor stator 10 shown has six of twelve poles 12 illustrated having adjacent back irons 56 of adjacent poles 12 butted against each other and adjacent stator faces 18 of adjacent stator poles 12 spaced from each other. The stator assembly portion 10 is illustrated as one stator component 12 long. However as discussed above, a modular conical stator pole 12 may have a plurality of stator components stacked axially to form a stator pole 12 having a plurality of coils 54 held in spaced relation and axially aligned.

The motor 10 is easily constructed and maintained by the use of individual components 12. The stator components 12 are circumferentially assembled to define the rotor space 12. This modular approach allows an individual component 12 to be replaced and maintained in place without replacing the electric motor.

Referring to FIGS. 3a and 3b, a stator pole 12 assembled together and in exploded view. The conical stator assembly 10 has a conical interior surface 20 and a rotor 24 shown in offset outline. The rotor 24 is spaced from the 10 by air gap 34. Each stator pole 12 is equally radially spaced from the axis 14 to interact with the magnets 28 on the rotor 24. The conical shaped rotor 24 has a small end 122 and a large end 124.

The coil 54 comprises a plurality of windings of a conductive material preferably copper or aluminum wire. The wire is insulated along its length to prevent short circuit connections between the windings. The coil 54 may be toroidal or rectangular in shape having an open core 70 (FIG. 3) and is held in place by the tooth 16. The coil 54 may be wound directly on the tooth body 120 or may be formed separately as a bobbin or winding on a mandrel. A magnetic field generated by the coil 54 is conducted and shaped by the tooth 16 at the stator face 18 and directed into the rotor space 22.

Continuing to refer to FIGS. 3a and 3b, the stator component 12 may be formed of ferrous magnetic metal powder particles that are processed to be generally mutually insulated from the other particles. The particles are pressure formed into a desired, predetermined shape. The tooth 16 comprising a face 18, back iron 56 and tooth body 120 may be molded having the tooth body 120 integrally molded with the back iron 56 or the tooth face 18. The tooth body 120 acts as a winding support for the coil 54 as well as a flux conductor or guide to shape and support a magnetic field generated by current in the wire 64 energizing the coil 54. In the embodiment of FIGS. 3a, 3b, 4a and 4b, the tooth body 120 is integrally formed with the back iron 56, 156 on a first end 126 of the tooth body 120 and the tooth face attached to a second end 128 of the tooth body 120.

The coil 54 supported between the first end 126 and the second end 132. The second end 128 of the tooth body 120 extends through the open core 70 and into pocket 137 and is thereby removably attached to the tooth face 18 using adhesive or fasteners. The tooth face 18 has a tooth pocket 137 formed therein for receiving the second end 128.

Referring to FIGS. 4a and 4b, tooth pocket 137 may be a through passage opening into the concave face 118 of tooth 116. The tooth 116 comprises a back iron 156, a tooth body 120 and a tooth face 118 having a concave inner surface. The coil 154 is disposed around the tooth body 120 and secured between the face 118 and the back iron 156. The second end 128 may have a concave surface 136 adapted to align with the tooth face 118 to form a portion of the concave inner surface 20 of the rotor space 22 (FIG. 1) as the second end is disposed in the pocket 137

Figure 5:
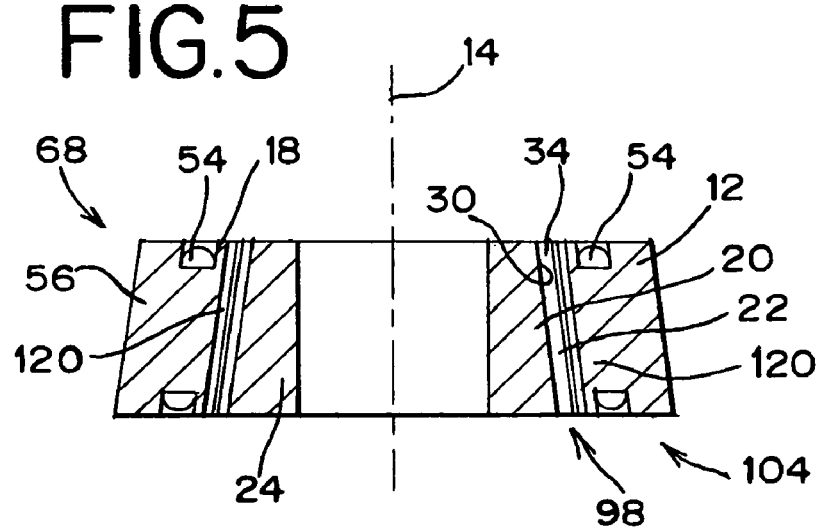
FIG. 5 is a perspective section view of FIG. 1. taken at 4-4.

Referring to FIG. 5, a cross section portion of a conical shaped stator assembly 10 is shown sectioned along a radius of the stator 10. The cross section of each stator pole 12 has a parallelogram shape having the ends perpendicular to the axis 14 and the sides (face and back iron) 18,56 oriented at an acute angle to the axis to form the conical shape. The parallelogram shaped tooth 16 may be formed by molding the face 18 in a planar configuration, the body radially oriented and the back iron formed to have angled ends that when assembled with the winding support and the face create a parallelogram shape having the sides tapering away from the axis to form the conical shape. Alternatively, the stator assembly may be assembled to conical shape having a radially extending cross section tapering along the axis to form the overall conical shape 98 of the rotor space 22 stator. The back iron 56 may be molded with a trapezoidal shape (FIG. 3a) thus forming the conical shape 88. In either configuration the rotor space 22 is formed in a conical shape 98 causing the adjoining faces 18 to form a concave surface 20 about the axis 14 of the stator 10 while the axial dimension is disposed in a non-parallel relation to the axis 14 creating the conical shaped rotor space 22.

Figure 6:
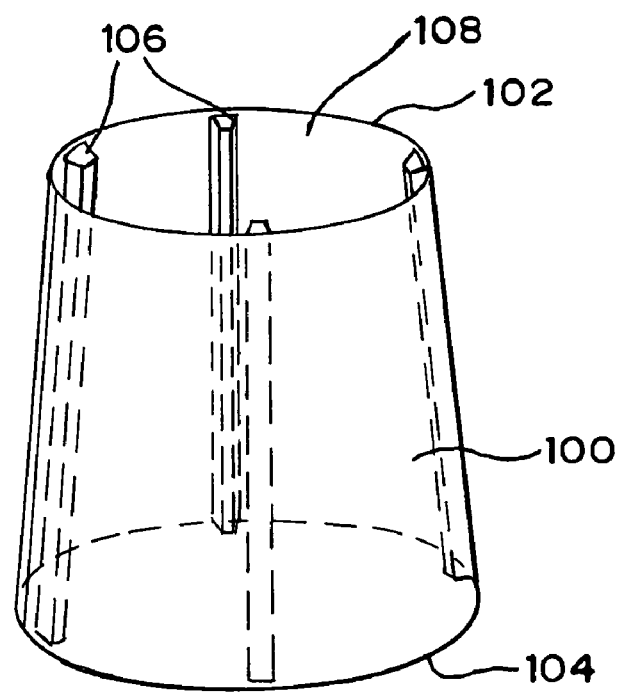
FIG. 6 is a perspective view of a motor housing.

Referring to FIG. 6 a housing 100 is illustrated having small end 102 and a large end 104 to contain the conical 10 (FIG. 1). An alignment rib 106 may be disposed on the interior surface 108 of the housing 100 radially aligned an alignment channel 74 on certain stator poles 12 (FIG. 1). The alignment rib 106 engages the alignment channel 74 (FIG. 2) on the stator pole components 12 to hold the stator components 12 radially aligned (FIG. 1).

In use, the stator component 10 is assembled with the coil 54 held on the tooth 16 between the back iron 56 and the tooth face 18. The tooth body 120 is integrally molded to either the tooth face 18 or the back iron 56. The non-integrally molded part is attached using adhesive, fasteners or other fastening techniques. For example if the tooth body 120 is integrally molded to the back iron 56 as shown in FIG. 3, the face 18 is attached to the second end 132 of the body 120 spaced from the back iron 56. Each coil 54 has a connector 64 extending from the winding to electrically connect the coil 54 to a current source 66 for providing a magnetic field at the stator pole 10 or to a power consuming device if the segment is connected as a generator. The axial edges 68 of adjacent tooth face 18 may abut against each other to form a smooth concave interior surface 20 or may be held in spaced relation as shown in FIG. 1. The axial ends of adjacent back iron 56 components may abut against each other to form the continuous outer conical shape 88 (FIG. 1, 5) of the back iron structure 56 or may be held in spaced relation by the alignment rib 106 (FIG. 6).

The stator 10 is assembled using the following steps not necessarily in the order listed:

Mold a stator pole comprising a tooth 16 having a tooth body 120, a back iron 56 and a tooth face 18 from soft magnetic composites (SMC) comprising ferrous magnetic metal powder particles, the back iron 56 having a trapezoidal shape comprising complex angles for forming a conical shaped stator 10 when assembled with other similar teeth 16, the trapezoidal shape having an outer surface spaced from an axis 14 of the stator 10 at a first radial distance adjacent the small end 102 of the conical shaped stator 10 and the outer surface spaced a second radial distance adjacent the larger end 104 of the conical shaped stator 10, the second radial distance larger than the first radial distance;

Mold the tooth body integral with either the back iron or the tooth face;

Wind a coil on a mandrel or a bobbin, the coil wound with a predetermined wire having a thickness, the wire wrapped a predetermined number of windings around the mandrel or bobbin forming a plurality of turns and an open core 70 in the center;

Place the coil on the tooth 16 having the tooth body 120 extending through the open core 70;

Secure the coil on the tooth body 120 between the back iron on a first end of the tooth body and the tooth face 18 on the second end of the tooth body;

Forming a pocket 137 on the tooth face 18 if the tooth body is formed integrally with the back iron, the tooth pocket 137 for receiving the tooth body 120 therein, the tooth face adapted to be mounted such that an inner surface 20 of the face is spaced a third radial distance from the axis 14 of the stator 10 adjacent the large end 104 of the stator and spaced a fourth radial distance from the axis of the stator 10 adjacent the small end 102 of the stator, the third distance greater than the fourth distance to form the conical shaped rotor space 22, attach the tooth face to the tooth by inserting the tooth body into the pocket 137 to secure the coil 54 between the tooth face 18 and the back iron 56, the tooth face 18 fastened to the tooth body 120 by adhesives or fasteners;

Form a pocket in the back iron 56 if the tooth body is formed integrally with the tooth face 18, The tooth pocket adapted to receive a first end of the tooth body to adapt the back iron to attach to the tooth body to secure the coil in place, Attach the back iron to the tooth by inserting the first end of the tooth body into the pocket on the back iron 56 to secure the coil 54 between the tooth face 18 and the back iron 56, the back iron fastened to the tooth body 120 by adhesives or fasteners; and Circumferentially assemble a plurality of stator poles 12 about an axis 14, the stator poles held in place by fasteners, a housing 100 or other known holding means, the stator poles 12 forming a conical shaped stator assembly 10 having a conical shaped rotor space 22.

In operation, the rotor 24 may be axially moved in operation to increase or decrease the air gap 34 between the rotor 24 and the stator 10. The rotor 24 movement axially with respect to the stator 10 uniformly changes the air gap across the entire stator assembly. The rotor 24 is moved in a direction of from the small end 102 of the conical shaped stator 10 towards the large end 104 of the conical shaped stator 10 to uniformly increase the air gap 34 between the rotor 24 and stator 10 to decrease back emf and weaken the rotor flux allowing an increased speed range for permanent magnet motors.

The present invention has been shown and described with reference to the foregoing exemplary embodiments. It is to be understood, however, that other forms, details, and embodiments may be made without departing from the spirit and scope of the invention which is defined in the following claims.

I claim:

1. A conical modular stator comprising a plurality of stator poles assembled about an axis, each stator pole comprising:
   a plurality of individual teeth, each tooth molded of soft magnetic composites, each tooth comprising a face, a body and a back iron, the tooth face having a concave inner surface formed at a non-parallel orientation to the axis, the back iron having a trapezoidal shape; and
   a first coil on the body of the each tooth, the first coil comprising a plurality of turns of wire, the first coil disposed intermediate the face and back iron wherein the back iron holds the coil in spaced relation to the axis, and wherein the face on each tooth further includes a pocket, the tooth body having a first end adjacent the back iron and a second end spaced from the first end, the tooth body second end extending into the pocket, and wherein the second end of the tooth body has a concave surface complementary to the tooth face concave inner surface.

2. The invention of claim 1, wherein the soft magnetic composites comprise ferrous magnetic metal powder particles.

3. The invention of claim 1, wherein the soft magnetic composites comprise ferrous particles processed to be generally mutually insulated.

4. The invention of claim 1, wherein the coil comprises a bobbin wound with the plurality of turns of wire separately from the tooth, the bobbin comprising an open core, the body adapted to extend through the open core wherein the bobbin holds the turns of wire removably on the body intermediate the face and back iron.

5. The invention of claim 1 wherein the inner side of each face comprises a generally concave shape.

6. The invention of claim 1 further comprising an electrical device electrically connected to the coil on the first tooth.

* * * * *